United States Patent [19]

Kelley

[11] Patent Number: 5,377,512
[45] Date of Patent: Jan. 3, 1995

[54] DISK DRIVE LOCK ASSEMBLY

[75] Inventor: Donald W. Kelley, Fremont, Calif.

[73] Assignee: Qualtec Data Products, Inc., Fremont, Calif.

[21] Appl. No.: 191,459

[22] Filed: Jan. 31, 1994

Related U.S. Application Data

[63] Continuation of Ser. No. 942,577, Sep. 9, 1992, abandoned.

[51] Int. Cl.$^6$ ............................................. E05B 73/00
[52] U.S. Cl. .................................... 70/58; 70/14; 248/205.3; 248/553
[58] Field of Search ..................... 70/14, 57, 58, 158, 70/375, 380; 248/205.3, 553; 360/137

[56] References Cited

U.S. PATENT DOCUMENTS

| | | | |
|---|---|---|---|
| 1,691,529 | 11/1928 | Schlage | 70/375 |
| 4,068,508 | 1/1978 | Genakis | 70/375 X |
| 4,398,405 | 8/1983 | Patriquin | 70/375 X |
| 4,527,405 | 7/1985 | Renick et al. | 70/14 |
| 4,616,490 | 10/1986 | Robbins | 70/14 |
| 4,640,106 | 2/1987 | Derman | 70/14 |
| 4,655,057 | 4/1987 | Derman | 70/14 |
| 4,685,312 | 8/1987 | Lakoski et al. | 70/14 |
| 4,741,185 | 5/1988 | Weinert et al. | 70/14 X |
| 4,794,587 | 12/1988 | Cordiano | 369/292 |
| 4,856,304 | 8/1989 | Derman | 70/14 |
| 4,907,111 | 3/1990 | Derman | 70/14 X |
| 4,918,952 | 4/1990 | Lakoski et al. | 70/57 |
| 4,922,734 | 5/1990 | Iannucci | 70/58 |
| 4,924,683 | 5/1990 | Derman | 70/14 |
| 4,942,071 | 7/1990 | Frye | 248/205.3 X |
| 4,959,979 | 10/1990 | Filipow et al. | 70/58 |
| 4,962,907 | 10/1990 | Gary | 248/205.3 |
| 4,964,285 | 10/1990 | Lakoski et al. | 70/14 |
| 4,977,762 | 12/1990 | Dennis | 70/14 |
| 5,022,242 | 6/1991 | Povilaitis | 70/14 |
| 5,117,661 | 6/1992 | Carl et al. | 70/14 |
| 5,124,871 | 6/1992 | Smith | 70/14 X |
| 5,136,862 | 8/1992 | Langen | 70/14 |

Primary Examiner—Lloyd A. Gall
Attorney, Agent, or Firm—Fliesler, Dubb, Meyer & Lovejoy

[57] ABSTRACT

A disk drive lock assembly is provided having a housing, a slot blocking member movably mounted within the housing for linear movement relative to the housing, a key-actuated lock assembly coupled to a cam member located in the housing for moving the slot blocking member in a linear fashion relative to the housing between a retracted position and an extended position and a pad member which can be provided with an adhesive for permanently affixing the disk drive lock assembly to a disk drive adjacent to a disk receiving slot therein. In operation, the slot blocking member is selectively moved between a retracted position and an extended position for selectively blocking access to a disk receiving slot in a disk drive.

18 Claims, 1 Drawing Sheet

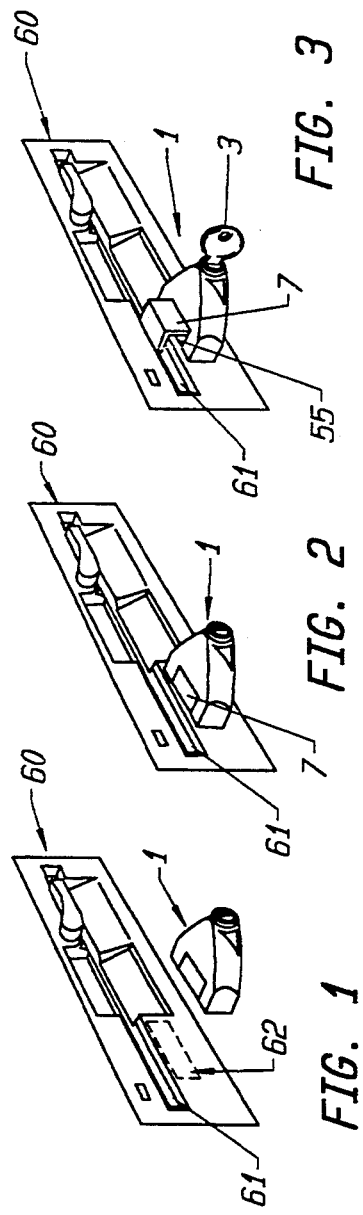
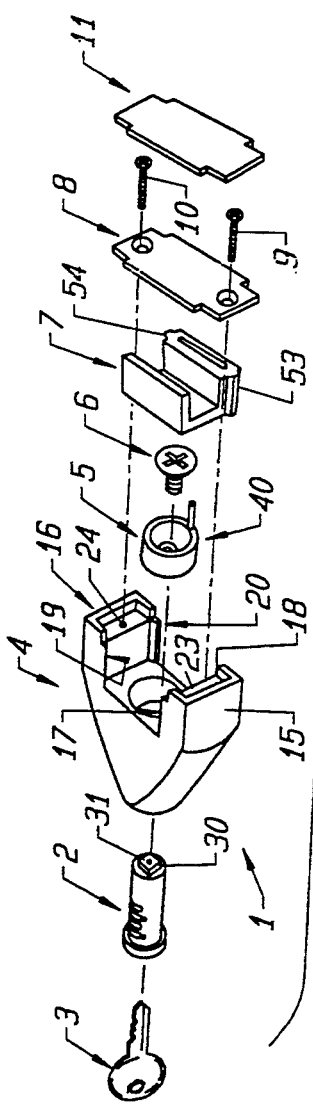
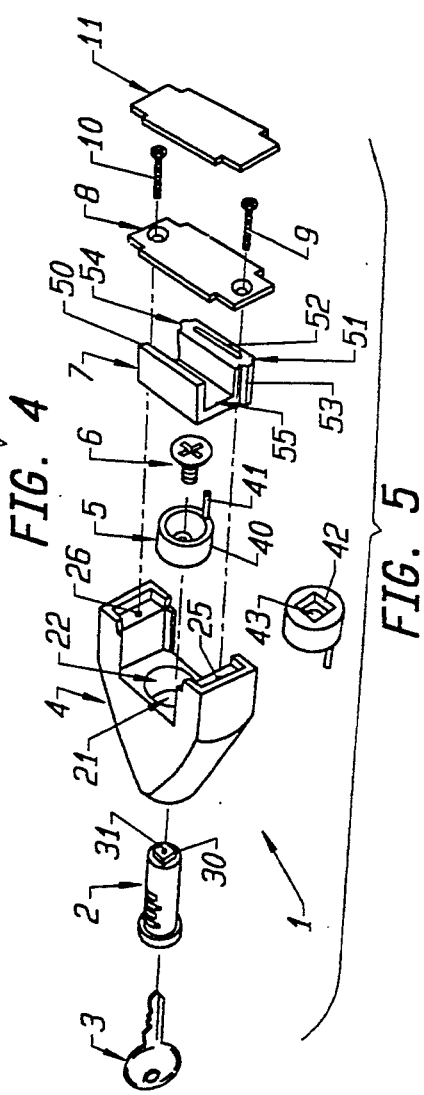

DISK DRIVE LOCK ASSEMBLY

This application is a continuation of Ser. No. 07/942,577, filed Sep. 9, 1992, now abandoned.

BACKGROUND OF THE INVENTION

1. Field of the Invention

The present invention relates to security apparatus in general and in particular to a key-actuated lock assembly having a linearly movable slot blocking member for selectively blocking the disk receiving slot in a disk drive.

2. Description of the Related Art

It is sometimes necessary to restrict access to a disk drive such as a floppy or CD read-only-memory (ROM) disk drive so as to prevent an unauthorized use thereof.

Heretofore, conventional floppy disk, CD ROM disk and cassette tape drive locks which have been used to prevent unauthorized use of a floppy disk, CD ROM disk or cassette tape drive have included apparatus which is inserted in the disk/cassette receiving slot in the drive as well as apparatus which is selectively placed in front of the entrance to the disk/cassette receiving slot in the drive so as to prevent a disk/cassette from being inserted into and/or removed from the slot in the drive.

Examples of floppy disk drive locks which comprise apparatus which is normally inserted in the slot of a floppy disk drive are the locks disclosed in U.S. Pat. Nos. 5,136,862; 5,117,661; 4,924,683; 4,907,111; 4,794,587; and 4,685,312.

Examples of cassette tape/CD ROM disk drive locks which comprise apparatus which is normally inserted in the slot of a cassette tape/CD ROM disk drive are the locks disclosed in U.S. Pat. Nos. 5,124,871; 5,022,242; 4,977,762; 4,959,979; 4,922,734; 4,856,304; 4,741,185; 4,655,057; 4,640,106; 4,616,490; and 4,527,405.

Among the disadvantages of the disk/cassette tape drive lock apparatus disclosed in the above-identified patents is that it tends to be bulky, must be manually removed from the apparatus and usually must be stored in a separate place when not being used to lock the apparatus, thus making the lock apparatus troublesome to use.

Another disadvantage of the lock apparatus which comprises a member which is inserted in the disk drive slot is that the lock apparatus requires that the disk slot be empty and therefore cannot be used to lock a disk in the slot.

Still another disadvantage is that the insertion of any object in a disk receiving slot of a drive gives rise to the possibility of inadvertently damaging the drive.

Examples of floppy disk drive locks which comprise apparatus which is selectively placed in front of the entrance of the slot in the disk drive so as to prevent a disk from being inserted into or removed from the disk receiving slot in the disk drive are the lock assemblies disclosed in U.S. Pat. Nos. 4,918,952 and 4,964,285. Each of the lock assemblies disclosed in these patents is distinguished by the manner in and means by which the disk receiving slot is blocked and is found to have one or more significant disadvantages. Among the disadvantages of the lock assembly disclosed in U.S. Pat. No. 4,918,952 ('952) are the following: the lock assembly requires a customized disk drive bezel which must be used in lieu of or as a replacement for a conventional bezel; it is expensive to manufacture; and it is time consuming to retrofit.

Another disadvantage of the lock assembly of '952 is that the locking bar used therein comprises a relatively small triangularly shaped member which is located on the backside of the bezel and therefore is difficult to see when in its blocking position, particularly if the drive is not directly in front of the operator.

Among the disadvantages of the lock assembly disclosed in U.S. Pat. No. 4,964,285 ('285) is that the blocking member requires a clearance on the face of the disk drive which is coextensive with the surface swept by the blocking member as it is rotated between its blocking and unblocking positions.

Another disadvantage of the lock assembly of '285 is that the size of the typical commercial embodiment of the lock assembly and its operation prevents its being used in connection with modern smaller sized half-height disk drives.

Another disadvantage of the lock assembly of '285 is that the blocking member comprises a relatively small triangularly-shaped member which, due to its size and configuration, does not present a particularly strong visual indication that access to the disk drive slot is being blocked even though its surface may comprise a bright color, e.g. red or the like.

Still another and very significant disadvantage of the lock assembly of '285 is that the blocking member cannot be moved by means of the rotation of a key inserted therein, as would normally be expected, but must be rotated manually in a separate operation after a proper key has been inserted in the lock assembly. Experience has shown that the proper operation of the lock assembly of '285 requires special instruction in that the need for separately rotating the blocking member after the insertion of a proper key in the lock assembly is not at all obvious to most people and that most people try to rotate the key and failing to do that assume that the wrong key is being used or that the lock is defective.

SUMMARY OF THE INVENTION

In view of the foregoing, a principal object of the present invention is a disk drive lock assembly having a slot blocking member which is selectively movable in a linear fashion between a retracted position and an extended position for selectively locking a disk drive.

Another object of the present invention is a disk drive lock assembly as described above wherein the slot blocking member is selectively movable in a linear fashion in response to the rotation of a key in a key-actuated lock assembly.

Still another object of the present invention is a disk drive lock assembly wherein the slot blocking member presents a "flag" of significant visual impact indicating that the drive is locked when the slot blocking member is in its blocking position.

In accordance with the above objects there is provided a disk drive lock assembly comprising a housing, a slot blocking member movably mounted within the housing for linear movement relative to the housing, and means located in the housing for moving the slot blocking member in a linear fashion relative to the housing between a retracted position and an extended position. In addition there is provided a means for mounting the housing with the slot blocking member movably mounted therein on a disk drive adjacent to a disk receiving slot in the disk drive so that the slot blocking member blocks the disk receiving slot when the slot blocking member is in its extended position and is removed from blocking the disk receiving slot when the slot blocking member is in its retracted position.

In a preferred embodiment of the present invention the means located in the housing for moving the slot blocking member in a linear fashion relative to the housing between a retracted position and an extended position comprises a rotatable cam member. The cam member is provided with a pin which extends therefrom for insertion in a slot provided therefore in the lower end of the slot blocking member so that as the cam member is rotated between a first and a second position the slot blocking member is moved in a linear fashion between its retracted and extended positions.

In practice the cam is attached to the interior end of a key-actuated rotatable cylindrical lock assembly so as to prevent relative movement therebetween.

A feature of the slot blocking member is that it may comprise a U-shaped body member for receiving between the legs thereof a disk partially ejected from a disk drive when the slot blocking member is in its extended position.

BRIEF DESCRIPTION OF THE DRAWINGS

The above and other objects, features and advantages of the present invention will become apparent from the following detailed description of the accompanying drawings, in which:

FIG. 1 is a perspective view of a disk drive lock assembly according to the present invention showing in broken lines its preferred placement adjacent to a disk slot in a disk drive.

FIG. 2 is a perspective view of the embodiment of FIG. 1 with the slot blocking member of the lock assembly of the present invention in its retracted position.

FIG. 3 is a perspective view of the lock assembly according to the present invention with the slot blocking member of FIG. 2 in its extended position.

FIG. 4 is an exploded view of the lock assembly of FIGS. 1-3 according to the present invention.

FIG. 5 is an exploded view of the embodiment of FIG. 4 showing in broken lines the manner in which parts of the lock assembly according to the present invention are assembled and a rear view of the cam member according to the present invention.

DESCRIPTION OF THE PREFERRED EMBODIMENTS

Referring to FIG. 4 and 5, there is provided in accordance with the present invention a floppy disk drive lock assembly designated generally as 1. In the lock assembly 1 there is provided a key-actuated cylindrical rotatable lock assembly designated generally as 2 which is actuated by means of a key 3, a housing 4, a rotatable cam member 5, a screw 6, a U-shaped slot blocking member 7, an end plate 8, a pair of mounting screws 9 and 10 and a pad 11.

The U-shaped housing 4 comprises a pair of legs 15 and 16. Leg 15 has a pair of inwardly directed flanges 17 and 18. Leg 16 has a pair of inwardly directed flanges 19 and 20. Centrally located in the housing 4 there is provided a cylindrical bore 21 for receiving the lock assembly 2 and a cylindrical bore 22 for receiving the cam 5. At the ends of the legs 15 and 16 there is provided a pair of recesses 23 and 24 for receiving the end plate 8 and a pair of threaded screw holes 25 and 26 for receiving the screws 9 and 10 respectively, as shown clearly in FIG. 5.

On the interior end of the lock assembly 2, there is provided a noncircular extension 30 and a threaded screw receiving hole 31. In the embodiment shown the extension 30 comprises a square shaped cross-section.

In the cam member 5 there is provided a cylindrical body member 40. Extending from the edge of the body member 40 there is provided a pin member 41. Centrally located in the rear of the member 40 there is provided a noncircular recess 42, as seen in FIG. 5, which corresponds to the noncircular extension 30 on the interior end of the lock assembly 2 for receiving the extension 30, and on the opposite side thereof a circular hole 43 in which the screw 6 is inserted and threaded in the hole 31 in the lock assembly 2 for attaching the cam member 5 to the lock assembly 2. The noncircular extension 30 and the noncircular recess 42 prevent rotation of the cam member 5 relative to the lock assembly 2.

In the U-shaped slot blocking member 7 there is provided an upper leg 50 and a lower leg 51. In the lower leg 51 there is provided a cam pin receiving slot 52 into which the cam pin 41 of the cam member 5 is inserted. Extending outwardly from the lower end 51 there is provided a pair of outwardly extending flanges 53 and 54. Flanges 53 and 54 are captured between the flanges 17 and 18 of the leg 15 and flanges 19 and 20 of the leg 16 of the housing 4. Located between the upper leg 50 and the lower leg 51 of the slot blocking member 7 there is provided a cavity designated generally as 55. The cavity 55 is provided for receiving the end of a disk member which is partially ejected from a disk drive when the slot blocking member 7 is in its extended position.

As indicated above, the end plate 8 is provided to be inserted in the recesses 23 and 24 provided therefore in the housing 4 and attached thereto by means of the screws 9 and 10 which are threaded into holes 25 and 26 in the housing 4 for holding the slot blocking member 7 in engagement with the cam member 5 in the housing 4.

To attach the housing 4 with the slot blocking member 7 movably mounted therein to a disk drive as shown in FIGS. 1-3, an adhesive is applied to both sides of the pad member 11. The adhesive may be any suitable adhesive which has high holding strength for affixing the housing 4 to the disk drive, as shown in FIGS. 2 and 3.

In practice the lock assembly 1 is attached to a disk drive designated generally as 60 adjacent to a disk receiving slot 61 disposed therein as shown by the broken lines 62 in FIG. 1. An important feature of the assembly 1 is that the assembly has a relatively small foot print on the face of the disk drive, e.g. 0.5 inches × 1.24 inches, and thus, the assembly 1 may be used to secure disk drives comprising a ½ height form factor.

In operation, when the key 3 is rotated the cam 5 is rotated causing the pin 41 to slide in the slot 51 raising the slot blocking member 7 from its retracted position, as shown in FIG. 2, to its extended position, as shown in FIG. 3. When the slot blocking member 7 is in its extended position it will be appreciated that it prevents the insertion of a disk into and the removal of a disk from the disk receiving slot 61.

Another important feature of the lock assembly of the present invention is that the cavity 55 in the slot blocking member 7 allows a disk to be partially ejected from the disk receiving slot 61 in the disk drive 60 without the necessity for retracting the slot blocking member 7. For example, when turning off the power to a computer and/or when rebooting a computer from a hard disk drive it may be necessary to temporarily eject a non-system disk from the disk drive to permit the computer to sequence through to the operating system on the hard drive. By means of the present invention this can be accomplished without retracting the slot blocking member 7.

Still another important feature of the lock assembly of the present invention is the relatively large size of the slot blocking member 7 which acts as a "flag" and provides a particularly strong visual indication of its presence in front of a disk drive slot particularly when it comprises a bright color, e.g. red.

While a preferred embodiment of the present invention is described above, it is contemplated that numerous modifications may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

What is claimed is:

1. A disk drive lock assembly comprising:
   a housing including a U-shaped body member having a first and a second leg;
   a slot blocking member movably mounted within the housing between said first and second legs;
   means for mounting the housing with the slot blocking member movably mounted therein on a disk drive adjacent to a disk receiving slot in the disk drive; and
   means located in the housing for moving the member in a linear fashion relative to said first and second leg between a retracted position and an extended position wherein a portion of the slot blocking member extends outside of the housing and outside of the disk receiving slot while the housing is mounted adjacent to the disk receiving slot so that the slot blocking member blocks the disk receiving slot when the slot blocking member is in its extended position and is removed from blocking the disk receiving slot when the slot blocking member is in its retracted position.

2. An assembly according to claim 1 wherein said slot blocking member moving means comprises:
   a rotatable cam member disposed in a bore provided therefore in the housing;
   means for rotating the cam member between a first position and a second position; and
   means for coupling the cam member and the slot blocking member so that the slot blocking member is moved in a linear fashion between its retracted position and its extended position as the cam member is rotated between its first and its second positions about an axis of rotation which is perpendicular to the direction of movement of the slot blocking member.

3. An assembly according to claim 2 wherein said slot blocking member comprises a slot in a lower end thereof, said cam member comprises a cylindrical body member which is disposed for rotation about an axis of rotation within the bore provided therefor in the housing and said means for coupling the cam member and the slot blocking member comprises a pin member which extends from the cylindrical body member in the cam member for insertion in the slot in the lower end of the slot blocking member.

4. An assembly according to claim 2 wherein said means for rotating the cam member between a first position and a second position comprises:
   a rotatable lock assembly disposed in a bore provided therefore in the housing; and
   means for attaching said cam member to said rotatable lock assembly.

5. An assembly according to claim 4 wherein said rotatable lock assembly and said means for attaching said cam member to said rotatable lock assembly comprises means for preventing relative movement between the rotatable lock assembly and the cam member.

6. An assembly according to claim 5 wherein said means for preventing relative movement between the lock assembly and the cam member comprises a noncircular bore in the cam member and a corresponding noncircular extension on the interior end of the rotatable lock assembly over which the cam member is fitted.

7. An assembly according to claim 6 wherein said means for preventing relative movement between the lock assembly and the cam member further comprises screw means for holding the cam member on the noncircular extension of the lock assembly.

8. An assembly according to claim 4 wherein said rotatable lock assembly comprises a key-actuated cylindrical rotatable lock assembly.

9. An assembly according to claim 1 wherein said means for mounting the housing with the slot blocking member movably mounted therein on a disk drive adjacent to a disk receiving slot in the disk drive comprises:
   a flexible pad member;
   means for affixing the pad member to the housing; and
   means for affixing the pad member to a surface of a disk drive.

10. An assembly according to claim 9 wherein said means for affixing the pad member to the housing and the surface of a disk drive comprises an adhesive.

11. A disk drive lock assembly comprising:
    a housing including a U-shaped body member having a first and a second leg, each of said legs having a pair of spaced flanges which extend inwardly from the interior walls thereof;
    a slot blocking member movably mounted within the housing for linear movement relative to the housing, said slot blocking member being located between said first and second legs of said housing and comprising a pair of flanges which extend outwardly from a lower end thereof which are captured between said spaced flanges extending from said first and second legs of said housing;
    means located in the housing for moving the slot blocking member in a linear fashion relative to the housing between a retracted position and an extended position; and
    means for mounting the housing with the slot blocking member movably mounted therein on a disk drive adjacent to a disk receiving slot in the disk drive so that the slot blocking member blocks the disk receiving slot when the slot blocking member is in its extended position and is removed from blocking the disk receiving slot when the slot blocking member is in its retracted position.

12. An assembly according to claim 11 comprising a plate member for holding the slot blocking member in said housing between said first and said second legs and in engagement with said slot blocking member moving means.

13. A disk drive lock comprising:
a housing having a first and a second bore and first and second leg members;
means for attaching the housing to an exterior surface of a disk drive adjacent to a disk receiving slot in the disk drive;
a key-actuated cylindrical lock assembly disposed in said first bore, said lock assembly having an exterior end for receiving a key and an interior end having a noncircular extension extending therefrom;
a cylindrical cam member disposed in said second bore for rotational movement therein, said cam member having a cam pin extending outwardly therefrom parallel to the axis of rotation of the lock assembly and a noncircular bore therein which corresponds to the shape of the noncircular extension on the interior end of the lock assembly for preventing rotational movement of the cam member relative to the lock assembly;
means for attaching the cam member to the lock assembly;
a slot blocking member disposed between the first and second leg members in the housing and having a slot in a lower end thereof for receiving the cam pin, said slot blocking member being movable linearly along a first axis between a retracted position wherein the slot blocking member is removed from being in front of the disk receiving slot and an extended position wherein the slot blocking member is located in front of the disk receiving slot by the cam pin as the cam member is rotated about an axis perpendicular to the first axis while the housing is attached to the exterior surface of the disk drive;
an end plate for holding the slot blocking member in the housing in engagement with the cam pin in the cam member; and
means for attaching the end plate to the housing.

14. A disk drive lock assembly comprising:
a housing;
a slot blocking member movably mounted within the housing for linear movement relative to the housing, said slot blocking member including a U-shaped body member for receiving between legs thereof a disk ejected from a disk drive when the slot blocking member is in its extended position;
means located in the housing for moving the slot blocking member in a linear fashion relative to the housing between a retracted position and an extended position; and
means for mounting the housing with the slot blocking member movably mounted therein on a disk drive adjacent to a disk receiving slot in the disk drive so that the slot blocking member blocks the disk receiving slot when the slot blocking member is in its extended position and is removed from blocking the disk receiving slot when the slot blocking member is in its retracted position.

15. A disk drive lock comprising:
a housing having a first and a second bore and a first and a second leg members;
a key-actuated cylindrical lock assembly disposed in said first bore, said lock assembly having an exterior end for receiving a key and an interior end having a noncircular extension extending therefrom;
a cylindrical cam member disposed in said second bore for rotational movement therein, said cam member having a cam pin extending outwardly therefrom and a noncircular bore therein which corresponds to the shape of the noncircular extension on the interior end of the lock assembly for preventing rotational movement of the cam member relative to the lock assembly;
means for attaching the cam member to the lock assembly;
a slot blocking member disposed between the first and second leg members in the housing and having a slot in a lower end thereof for receiving the cam pin, said slot blocking member being movable linearly along a first axis between a retracted position and an extended position by the cam pin as the cam member is rotated about an axis perpendicular to the first axis and having a U-shaped body member for receiving between legs thereof a disk ejected from a disk drive when the slot blocking member is in its extended position;
an end plate for holding the slot blocking member in the housing in engagement with the cam pin in the cam member;
means for attaching the end plate to the housing; and
means for attaching the housing to a disk drive adjacent to a disk receiving slot in the disk drive.

16. A disk drive lock assembly comprising:
a U-shaped body member having a first and a second leg, each of said legs having a pair of spaced flanges which extend inwardly from interior walls thereof;
a slot blocking member movably mounted within the housing for linear movement relative to the housing, said slot blocking member being located between said first and second legs of said housing and comprising a pair of flanges which extend outwardly from a lower end thereof and which are captured between said spaced flanges extending from said first and second legs of said U-shaped body member;
means for attaching the housing with the slot blocking member movably mounted therein to an exterior surface of a disk drive adjacent to a disk receiving slot in the disk drive; and
means located in the housing for moving the slot blocking member in a linear fashion relative to the housing between a retracted position wherein the slot blocking member is removed from being in front of the disk receiving slot and an extended position wherein the slot blocking member is located in front of the disk receiving slot while the housing is attached to the exterior surface of the disk drive.

17. A disk drive lock assembly comprising:
a housing;
a slot blocking member movably mounted within the housing for linear movement relative to the housing, said slot blocking member comprising a U-shaped body member for receiving between legs thereof a disk ejected from a disk drive when the slot blocking member is in its extended position;
means for attaching the housing with the slot blocking member movably mounted therein to an exterior surface of a disk drive adjacent to a disk receiving slot in the disk drive; and means located in the housing for moving the slot blocking member in a linear fashion relative to the housing between a retracted position wherein the slot blocking member is removed from being in front of the disk receiving slot and an extended position wherein the slot blocking member is located in front of the disk receiving slot while the housing is attached to the exterior surface of the disk drive.

18. A disk drive lock comprising:

a housing having a first and a second bore and first and second leg members;

means for attaching the housing to an exterior surface of a disk drive adjacent to a disk receiving slot in the disk drive;

a key-actuated cylindrical lock assembly disposed in said first bore, said lock assembly having an exterior end for receiving a key and an interior end having a noncircular extension extending therefrom;

a cylindrical cam member disposed in said second bore for rotational movement therein, said cam member having a cam pin extending outwardly therefrom parallel to the axis of rotation of the lock assembly and a noncircular bore therein which corresponds to the shape of the noncircular extension on the interior end of the lock assembly for preventing rotational movement of the cam member relative to the lock assembly;

means for attaching the cam member to the lock assembly;

a slot blocking member disposed between the first and second leg members in the housing and having a slot in a lower end thereof for receiving the cam pin, said slot blocking member being movable linearly along a first axis between a retracted position wherein the slot blocking member is removed from being in front of the disk receiving slot and an extended position wherein the slot blocking member is located in front of the disk receiving slot by the cam pin as the cam member is rotated about an axis perpendicular to the first axis while the housing is attached to the exterior surface of the disk drive, said slot blocking member comprising a U-shaped body member for receiving between legs thereof a disk ejected from a disk drive when the slot blocking member is in its extended position;

an end plate for holding the slot blocking member in the housing in engagement with the cam pin in the cam member; and means for attaching the end plate to the housing.

* * * * *

UNITED STATES PATENT AND TRADEMARK OFFICE
CERTIFICATE OF CORRECTION

PATENT NO. : 5,377,512
DATED : January 3, 1995
INVENTOR(S) : Donald W. Kelley

It is certified that error appears in the above-indentified patent and that said Letters Patent is hereby corrected as shown below:

Column 5, line 32, after "moving the" insert --slot blocking--;

Column 5, line 34, "leg" should be --legs--;

Column 7, line 65, "members" should be --member--.

Signed and Sealed this

Twenty-first Day of May, 1996

Attest:

BRUCE LEHMAN

Attesting Officer     Commissioner of Patents and Trademarks